US010710436B2

(12) United States Patent
Blendl et al.

(10) Patent No.: US 10,710,436 B2
(45) Date of Patent: Jul. 14, 2020

(54) MOTOR VEHICLE HAVING A VEHICLE PART THAT CAN BE DISPLACED RELATIVE TO THE VEHICLE STRUCTURE (71) Applicant: WEBASTO SE, Stockdorf (DE)

(72) Inventors: Dominik Blendl, Stockdorf (DE); Thomas Weiderer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/071,582

(22) PCT Filed: Jan. 29, 2016

(86) PCT No.: PCT/DE2016/100037
§ 371 (c)(1),
(2) Date: Jul. 20, 2018

(87) PCT Pub. No.: WO2017/129157
PCT Pub. Date: Aug. 3, 2017

(65) Prior Publication Data
US 2019/0070939 A1 Mar. 7, 2019

(51) Int. Cl.
*B60J 7/057* (2006.01)
(52) U.S. Cl.
CPC ............ *B60J 7/057* (2013.01); *B60J 7/0573* (2013.01)
(58) Field of Classification Search
CPC ................................ B60J 7/057; B60J 7/0573
USPC ........... 296/223, 187.03, 216.08, 93; 24/297, 24/293
See application file for complete search history.

(56) References Cited

U.S. PATENT DOCUMENTS 6,971,702 B2 * 12/2005 Boettger .................. B60J 10/16
296/146.15
2007/0262618 A1 11/2007 Gonzalez Merino et al.

FOREIGN PATENT DOCUMENTS

| DE | 102004031661 A1 | 1/2006 |
|---|---|---|
| DE | 102009011473 B3 | 11/2010 |
| EP | 1857311 A1 | 11/2007 |
| JP | H07-276995 A | 10/1995 |
| JP | H09-71135 A | 3/1997 |
| JP | H11-170872 A | 6/1999 |
| JP | 2010-132158 A | 6/2010 |

OTHER PUBLICATIONS

International Preliminary Report on Patentability issued against International Application No. PCT/DE2016/10037 dated Jul. 31, 2018.
International Search Report for PCT/DE2016/100037 dated Oct. 24, 2016 and English translation submitted herewith (7 Pages).

* cited by examiner

*Primary Examiner* — Dennis H Pedder
(74) *Attorney, Agent, or Firm* — Fitch, Even, Tabin & Flannery, LLP (57) ABSTRACT

A motor vehicle is provided having a vehicle structure and a vehicle part that can be displaced relative to the vehicle structure with the aid of at least one drive cable that is provided with a plastics injection molded section for joining the drive cable to the vehicle part. A load reduction device may have at least one coupling member which allows a relative movement between the displaceable vehicle part and the drive cable in the case of an acceleration of the vehicle part relative to the vehicle structure and which interacts with a catch device during the relative movement, the catch means absorbing at least part of the kinetic energy resulting from the acceleration.

14 Claims, 9 Drawing Sheets

MOTOR VEHICLE HAVING A VEHICLE PART THAT CAN BE DISPLACED RELATIVE TO THE VEHICLE STRUCTURE

CROSS-REFERENCE TO RELATED APPLICATIONS

This application is a U.S. national phase application filed under 35 U.S.C. § 371 of International Application No. PCT/DE2016/100037, filed Jan. 29, 2016, designating the United States, which is hereby incorporated herein by reference in its entirety for all purposes.

FIELD

The invention relates to a motor vehicle having a vehicle structure and a vehicle part that can be displaced relative to the vehicle structure with the aid of a drive cable that is provided with a plastics injection moulded section for joining it to the vehicle part.

BACKGROUND

Such a motor vehicle is known from practice and comprises, as the displaceable vehicle part, a lid member that forms part of a roof opening system and is manufactured from glass. The lid member is guided, via sliders, in guide rails on either side of the vertical longitudinal centre plane of the vehicle and can thus be shifted between a closed position in which a roof cutout has been closed with the aid of the lid member and a cleared position in which the roof opening has been cleared at least partially. For driving the lid member, the sliders on either side are connected to a drive cable that is realised as a so-called gradient cable and is driven with the aid of a common drive engine. For joining the drive cables to the sliders, each of the drive cables is provided with a plastics injection moulded section.

Development of roof opening systems is tending towards roof openings and, thus, the corresponding lid members ever increasing and hence also becoming ever heavier. This is in particular true for so-called spoiler roofs or for sliding roofs running on the outside, where the lid member, starting from the closed position, is initially deployed at its rear edge and is then advanced above a rear fixed-roof portion. For reasons of safety, it is required that the lid member does not even get detached from the vehicle structure in a crash situation, which would present an additional uncontrollable threat for persons. This could occur when the plastics injection moulded sections, via which the drive cables are linked to the drive slides of the lid member, crack or break away, as a result of which the lid member could burst lifting cams.

SUMMARY

It is the object of the invention to create a motor vehicle of the type referred to in the introduction, with which the risk of the vehicle part getting detached from the vehicle structure is minimised.

This object is attained in accordance with the invention by the motor vehicle having the features of claim 1.

In accordance with the invention, the motor vehicle thus comprises a load reduction means that comprises at least one coupling member which interacts with a catch means for dissipating kinetic energy that is to be apportioned to the vehicle part in the case of acceleration relative to the vehicle structure. The risk of the vehicle part breaking away from the drive cable is thus reduced in that the cause of this is eliminated. The cause of the plastics injection moulded section of the drive cable possibly breaking away is to be found in the fact that, in an accident situation, a high momentum can be imparted by the vehicle part to the plastics injection moulded section. By way of the load reduction means, which is realised so as to have the coupling member and the catch means in the spirit of the invention, the momentum can, however, be reduced to such an extent that, for example, a reinforcement of the plastics injection moulded section of the drive cable or of an injection moulded section of a drive slide for the vehicle part, which would necessitate a large installation space, is not necessary anymore.

The load reduction means of the motor vehicle according to the invention can be configured in such a way that it requires no maintenance and does not have any movable pieces, which could generate sounds that would be troublesome during vehicle operation. The load reduction means can directly be integrated into existing components, for example into the plastics injection moulded section of the drive cable and/or into a drive slide of the vehicle part, such that during assembly, i.e. when joining the drive cable to the vehicle part or to a drive slide of the vehicle part, no additional steps are required.

By way of the relative movement between the vehicle part and the drive cable, energy is dissipated in the catch means by way of the movement of the coupling member. At the end of the movement of the coupling member in the catch means, the load, which is exerted by the vehicle part onto the plastics injection moulded section, has been reduced to such an extent that the risk of the plastics injection moulded section breaking away is reduced or minimised. Hence, the vehicle part continues to be held at the vehicle structure via the drive cable. The vehicle part can thus be caught, wherein the remaining energy, which in particular results from an accident situation, is transmitted to the plastics injection moulded section. The amount of this energy is, however, so small that the plastics injection moulded section does not break away. The only result is a vehicle part that is slightly dislocated relative to the vehicle structure, however still being held at the vehicle structure via the drive cable.

In a special embodiment of the motor vehicle according to the invention, the coupling member comprises a portion that can be advanced in the catch means and that may be a tab, a pin, a stud or the like. It is in particular also conceivable to envisage two portions of this kind, which can be advanced in the catch means and via which energy is dissipated in each instance.

The coupling member, which can be advanced in the catch means, can be connected to the vehicle part or to a slide of the vehicle part in a rigid fashion, wherein the catch means is assigned to the plastics injection moulded section of the drive cable. When the load reduction means is activated, for example in an accident situation, the coupling member hence performs a movement in the plastics injection moulded section of the drive cable.

In an alternative embodiment of the motor vehicle according to the invention, the coupling member, which can be advanced in the catch means, is connected to the plastics injection moulded section of the drive cable in a rigid fashion and the catch means is assigned to the vehicle part or to a slide of the vehicle part. In this case, the coupling member performs a movement at the vehicle part or at a slide of the vehicle part when the load reduction means is activated.

In order to be able to realise the dissipation of kinetic energy in a targeted fashion, the catch means comprises, in a preferred embodiment of the motor vehicle according to the invention, deformation elements that are deformed and/or destroyed by the coupling member during the relative movement between the vehicle part and the drive cable. The coupling member hence acts on the deformation elements in a targeted fashion when the vehicle part is being accelerated relative to the vehicle structure, the deformation elements thereby being able to be deformed, distorted or ruptured.

The deformation elements are preferably formed by ribs, partition walls or pins of the catch means. The coupling member is gradually traversed against the individual deformation elements when the load reduction means is activated, energy being dissipated by each individual deformation element. The deformation elements can be realised so as to be continuous or also non-continuous, transverse to the direction of movement of the coupling member.

In a special embodiment of the motor vehicle according to the invention, the catch means includes a recess that is interspersed with partition walls, lands and/or ribs, which form the deformation elements and constitute predetermined breaking zones. The coupling member is advanced within the recess when the load reduction means is being used and strikes through or deforms the individual partition walls, lands and/or ribs.

A particularly advantageous effect, i.e. a particularly effective force dissipation, can be achieved if the thickness of the partition walls grows during the relative movement between the vehicle part and the drive cable in the direction of movement of the coupling member. Then, the thinnest partition wall is hence the first to be severed by the coupling member. The resistance that is held up by the partition walls increases from partition wall to partition wall.

In order to achieve, additionally, a braking effect by way of an interaction with a guide rail, in which the vehicle part and the drive cable are guided, it is advantageous if the recess is tapered in the direction of movement of the coupling member during the relative movement between the vehicle part and the drive cable. The coupling member can hence spread the catch means, as a result of which the latter is anchored or jammed in the corresponding guide rail for increasing the frictional forces.

In order to be able to produce a spreading movement of the catch means that is as defined as possible, the catch means can include at least one spreading surface against which the coupling member is traversed during the relative movement between the vehicle part and the drive cable.

For increasing the clamping effect between the catch means and a guide rail, the catch means, in a special embodiment, includes at least one braking rim that engages a guide surface when the catch means is being spread open, said guide surface being realised at a guide rail. By way of the braking rim, a wedge geometry is realised which supports and/or realises the energy reduction when the catch means is being spread open.

Advantageously, the catch means is formed by a sheet metal insert of the plastics injection moulded section. As an alternative, it is, as a matter of course, also conceivable that the catch means is formed by a suitable plastics insert having favourable material properties or by another metal moulded part.

The link of the drive cable to its plastics injection moulded section can be increased in that the sheet metal insert, which forms the catch means, has a corrugated longitudinal edge that corresponds to a wrapping of a drive cable that is realised as a gradient cable.

The vehicle part that can be caught with the aid of the load reduction means in accordance with the invention is, in a special embodiment, a lid member of a sliding roof system, in particular a roof element of a spoiler roof or of a sliding roof running on the outside, the load reduction means, in an accident situation, being able to decelerate or catch the lid member that has been accelerated relative to the vehicle structure.

Further advantages and advantageous configurations of the subject-matter of the invention can be taken from the description, from the drawing and from the claims.

Exemplary embodiments of the subject-matter of the invention are illustrated in a schematically simplified way in the drawing and will be explained in more detail in the following description.

DETAILED DESCRIPTION

Figure 1:
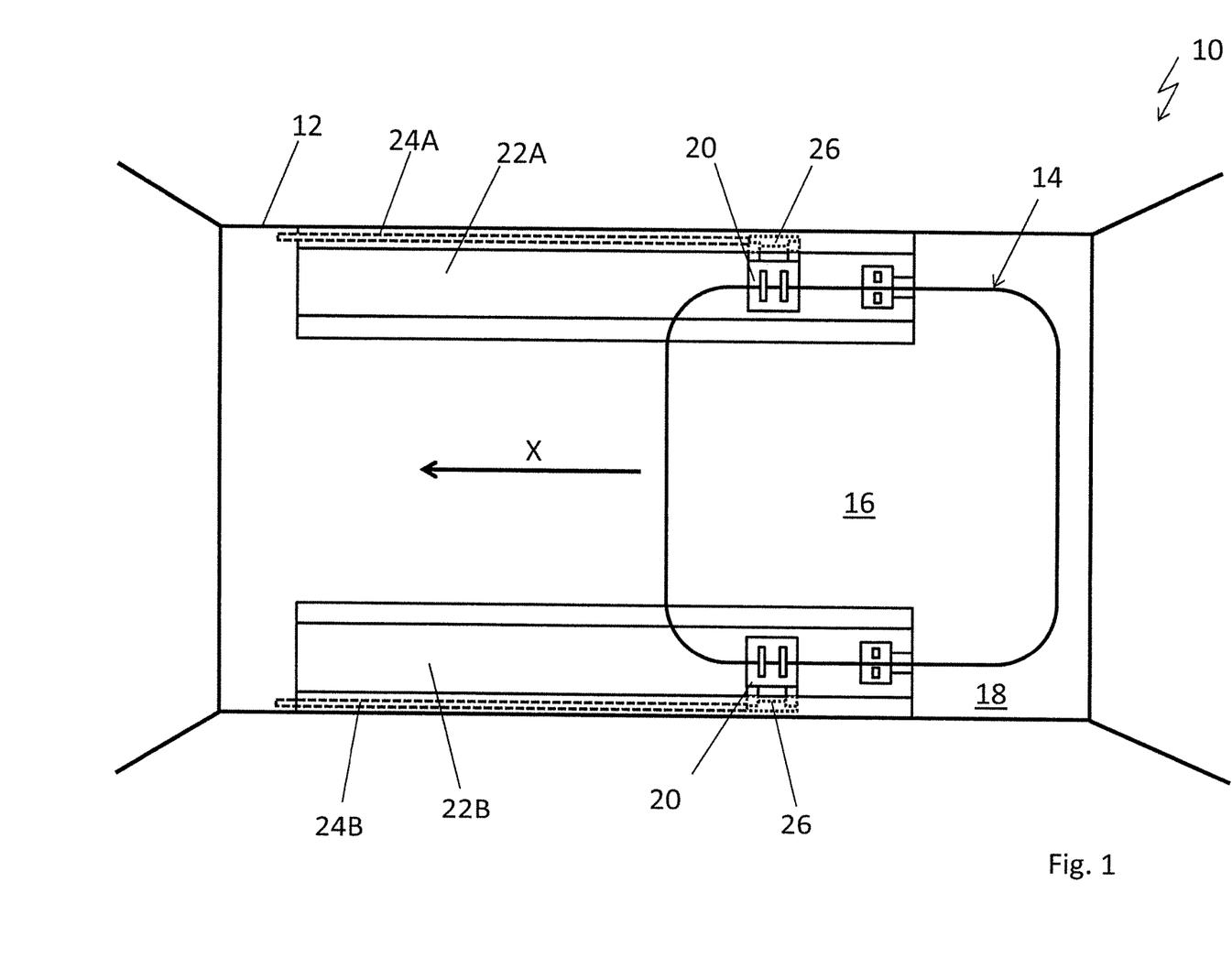
FIG. 1 shows a top view onto a vehicle roof of a motor vehicle according to the invention having a roof opening system.

In FIG. 1, parts of a motor vehicle 10 that is realised as a passenger car are illustrated, said vehicle having a vehicle roof 12 that is provided with a roof opening system realised as a sliding roof system 14. The sliding roof system 14 comprises a lid member 16 that can be displaced between a closed position, in which a roof opening that is not illustrated in more detail is closed, and an uncovering position, in which the roof opening is at least partially uncovered. In the uncovering position illustrated in FIG. 1, the lid member 16 has been traversed above a fixed-roof portion 18 bordering on the roof opening in the rear.

As a driving mechanism, the lid member 16 is connected to a drive slide 20 on either side of the vertical longitudinal centre plane of the roof, said drive slides being moveable in a respective guide rail 22A or 22B in the longitudinal direction of the vehicle and being connected to a respective drive cable 24A or 24B. For being joined to the respective drive slide 20, each of the drive cables 24A and 24B includes a plastics injection moulded section 26, which engages a corresponding recess of the respective drive slide 20 with a tab or the like.

Figures 2, 3, 4:
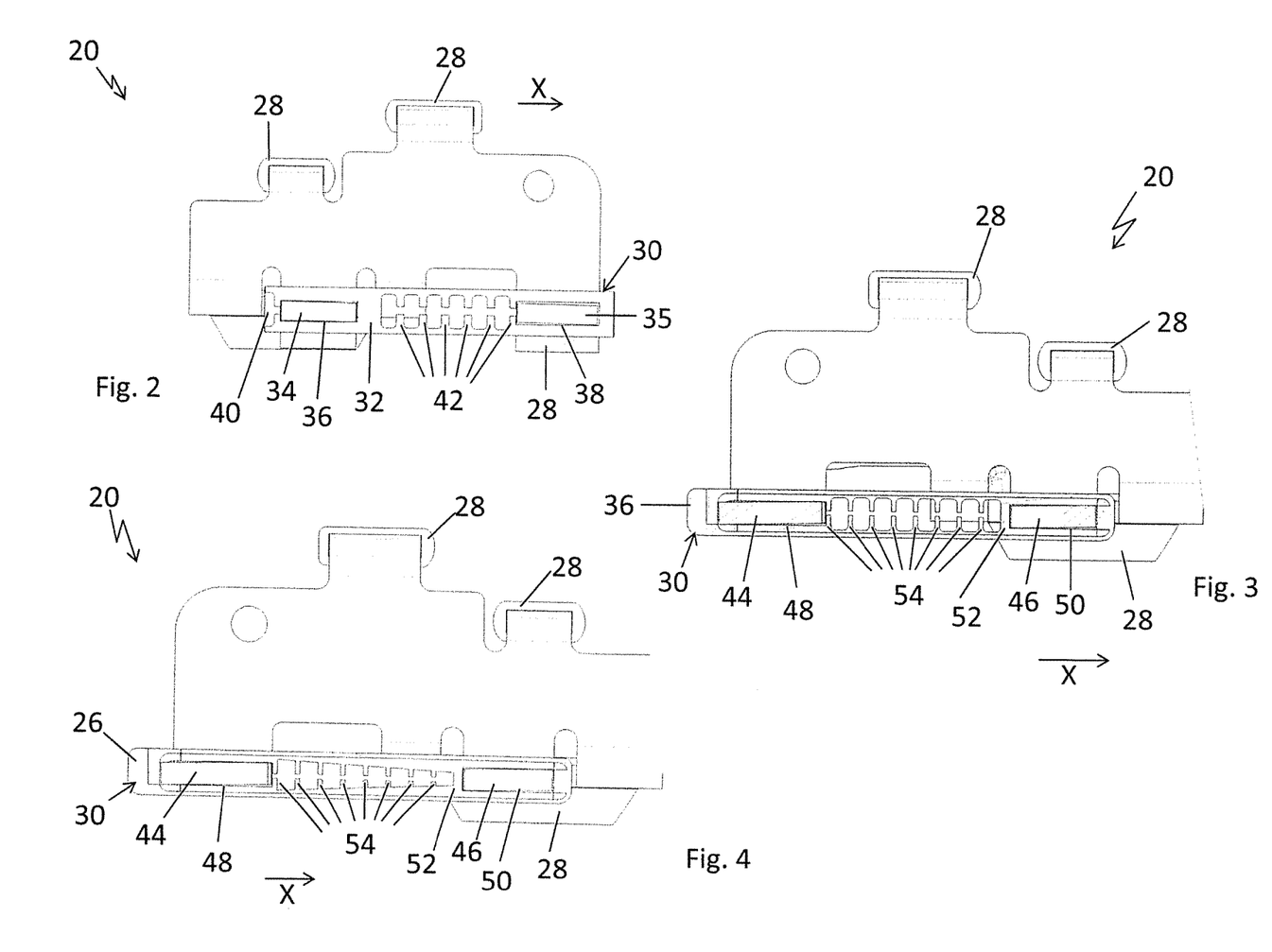
FIG. 2 shows a drive slide for a lid member of the sliding roof system having a load reduction means.
FIG. 3 shows an alternative embodiment of a drive slide having a plastics injection moulded section of a drive cable, into which a load reduction means has been integrated.
FIG. 4 shows a view that substantially corresponds to FIG. 3, of a drive slide and of a plastics injection moulded section of a drive cable having an alternative load reduction means.

A side view of a drive slide 20 for the lid member 16 is illustrated in FIG. 2. The drive slide 20, which is guided via sliders 28 in corresponding guide channels of the respective guide rail 22A or 22B, includes a load reduction means 30 in the junction area to the respective drive cable 24A or 24B, said load reduction means being formed by a catch means 32 that is realised as a sheet metal insert and by studs or pins 34 and 35, which are integrated at the plastics injection moulded section 26 of the respective drive cable 24A or 24B and can consist of metal inserts.

The catch means 32, which is realised at the drive slide 20, has recesses 36 and 38, the studs 34 and 35 engaging said recesses and constituting a coupling member and being connected to the respective drive cable 24A or 24B in a rigid fashion. Recess 36 is open to the outside via a slot 40.

Recess 38 continues, starting from the mounted position of stud 34, which is illustrated in FIG. 2, in the direction of recess 36, to be more precise in such a way that it is interrupted by ribs 42, which are spaced apart at regular intervals. The ribs or pins 42, which engage recess 38 from the top and from below, constitute deformation elements that are bent in recess 38 when the stud 34 is being traversed and that thereby absorb kinetic energy. Hence, a load reduction is realised when the lid member 16 that is connected to the drive slide 20 is being accelerated rapidly relative to the vehicle structure in the direction of the arrow X, that means in the direction of travel. The lid member 16 and the drive slides 20 can thus perform a relative movement with respect to the drive cable 24A or 24B, to which the studs 34 are joined in a rigid fashion via the respective plastics injection moulded section 26, the kinetic energy being absorbed and dissipated gradually via the ribs 42. Hence, the risk of the plastics injection moulded sections 26 breaking and of the lid member 16 getting detached from the vehicle structure or from the vehicle roof 12 in an accident situation, spurting in the forward direction of travel and constituting an additional hazard is minimised.

In FIG. 3, an alternative embodiment of a load reduction means 30 is illustrated, in which a drive slide 20, which is substantially realised so as to correspond to the drive slide illustrated in FIG. 2, includes two studs 44 and 46 that jut out in the direction of the plastics injection moulded section 36 of the respective drive cable 24A or 24B and that engage a respective recess 48 or 50, which is realised at a sheet metal insert 52 of the plastics injection moulded section 26. The sheet metal insert forms a catch means 52 of a load reduction means 30.

Recess 48 of the catch means 52 continues, starting from the mounted position, which is illustrated in FIG. 3, of stud 44, which constitutes a coupling member, in the direction of recess 50 with a ladder structure of sorts, which is formed from deformable ribs 54. The ribs 54, which are formed by pins pointing upwards and pointing downwards, are deformable and can absorb kinetic energy during a relative movement between the drive slide 20, which is fixedly connected to the lid member 16, and the assigned drive cable 24a or 24B, the ribs being deformed or destroyed in this process. Thus, the ribs 54 are deformation elements. Hence, the lid member 16 can perform, in an accident situation, in which it is accelerated rapidly relative to the vehicle structure starting from the open position, in the direction of the vehicle front (arrow X), a relative movement with respect to the respective drive cable 24A or 24B via the extension of the recess 48, which is interrupted by the ribs 54. Here, by way of the deformation of the ribs 54, kinetic energy is reduced, the remaining kinetic energy of the stud 44, when reaching the face side of recess 48 facing recess 50, being sufficiently low enough to eliminate the risk of the plastics injection moulded section 26 breaking away.

In FIG. 4, a drive slide 20 is illustrated together with a plastics injection moulded section 26 of a drive cable, said plastics injection moulded section comprising a load reduction means 30, which substantially corresponds to the load reduction means in accordance with FIG. 3, but differs from the same in that recess 48 of the catch means 52 is tapered like a wedge in the region of the ribs 54 in the direction of recess 50. Hence, wedge or spreading surfaces are formed for the stud 44 when it is being traversed in the region of the ribs 54 in the recess 48. When the stud 44 is being traversed against the spreading surfaces, the sheet metal insert, which forms the catch means 52, is widened, which in turn leads to the plastics injection moulded section 26 being widened in the vertical direction, whereby the plastics injection moulded section 26 of the drive cable 24A or 24B is jammed in the corresponding guide track of the guide rail.

Figure 5:
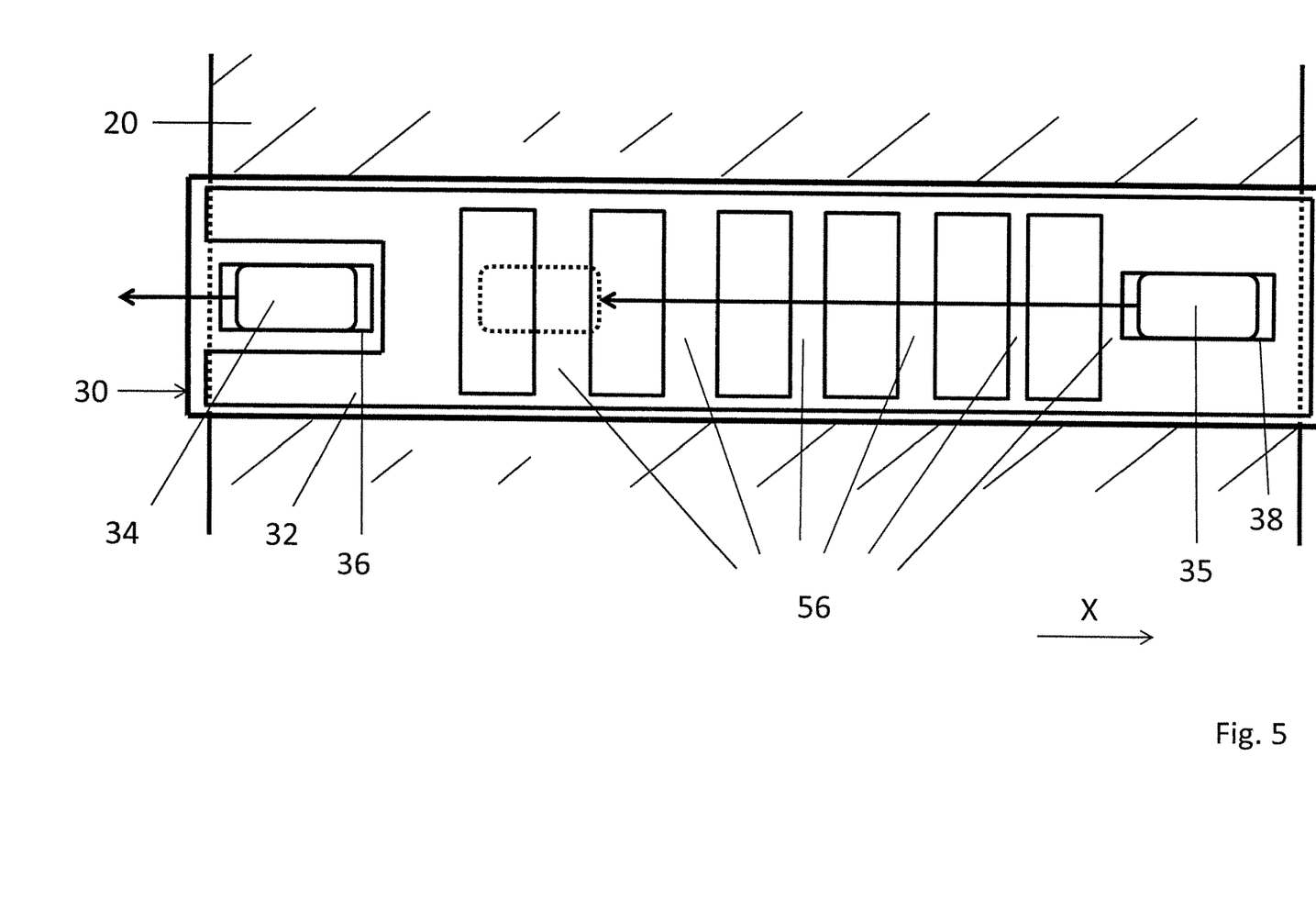
FIG. 5 shows an alternative embodiment of a load reduction means, realised at a drive slide.

In FIG. 5, another embodiment of a catch means 32, which is arranged at a drive slide of a sliding roof lid member, is illustrated, which corresponds to the catch means according to FIG. 2 to a large extent, but differs from the same in that the sheet metal insert, which forms the catch means 32, includes a ladder structure of sorts, which is formed from ribs 56, which are realised so as to be continuous in the vertical direction and have a thickness or width that increases gradually, starting from a stud 35, which forms a coupling member and is joined to the relevant drive cable. The ribs 56, which interrupt the recess 38 in the manner of partition walls, are pierced, in the case of an acceleration of the lid member, by the stud 35 in the direction of the arrow X until the stud has approximately reached the final position, which is illustrated in dashed lines in FIG. 5. On this path, the kinetic energy is reduced to such an extent that the risk of the plastics injection moulded section 26 breaking away has been minimised. Thus, the recess 38 is composed of the narrow mounting portion and individual strip-like penetrations of the catch means 32, which are separated from each other by the ribs 56.

Figure 6:
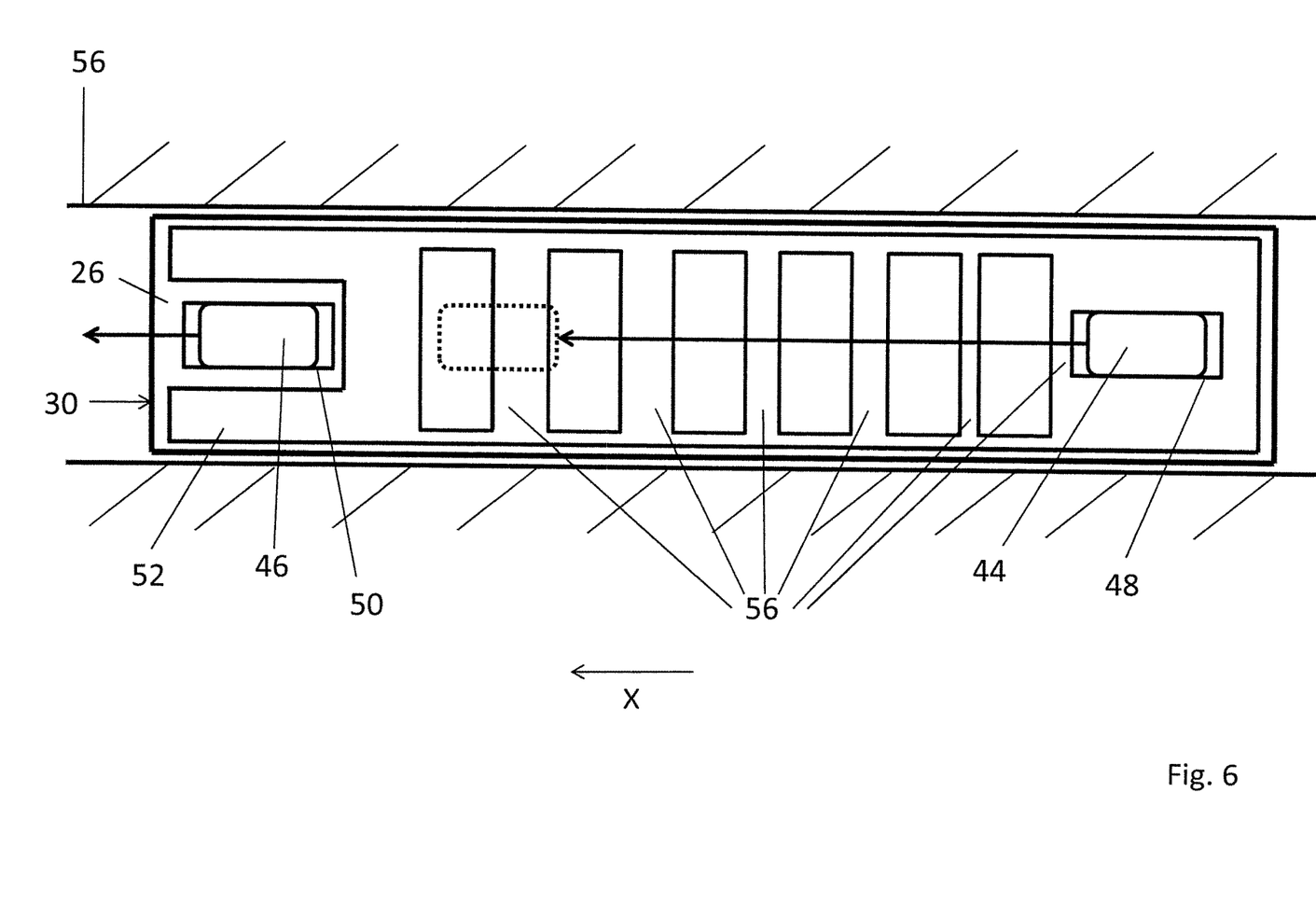
FIG. 6 shows another alternative embodiment of a load reduction means, arranged at an injection moulded section of a drive cable.

FIG. 6 shows a sheet metal insert, which is arranged in a plastics injection moulded section 26 of a drive cable for a lid member of a sliding roof system and serves as a catch means 52 for studs 44 and 46, which constitute a coupling member and are joined to a drive slide. In a manner corresponding to the embodiment according to FIG. 5, the catch means 52 has continuous ribs 56, which have an increasing thickness or width starting from the mounted position of the stud 44 in the recess 48. The function of the load reduction means 30 that is formed in this way corresponds to the function of the load reduction means according to FIG. 3, the ribs 56, upon an acceleration of the lid member 16, which is connected to the drive slide and to the studs 44 and 46, in the direction of the arrow X, being successively pierced by the stud 44 and kinetic being dissipated. Again, the recess 48 is composed of the narrow mounting portion and strip-shaped penetrations of the sheet metal insert, which are separated from each other by the ribs 56.

Figure 7:
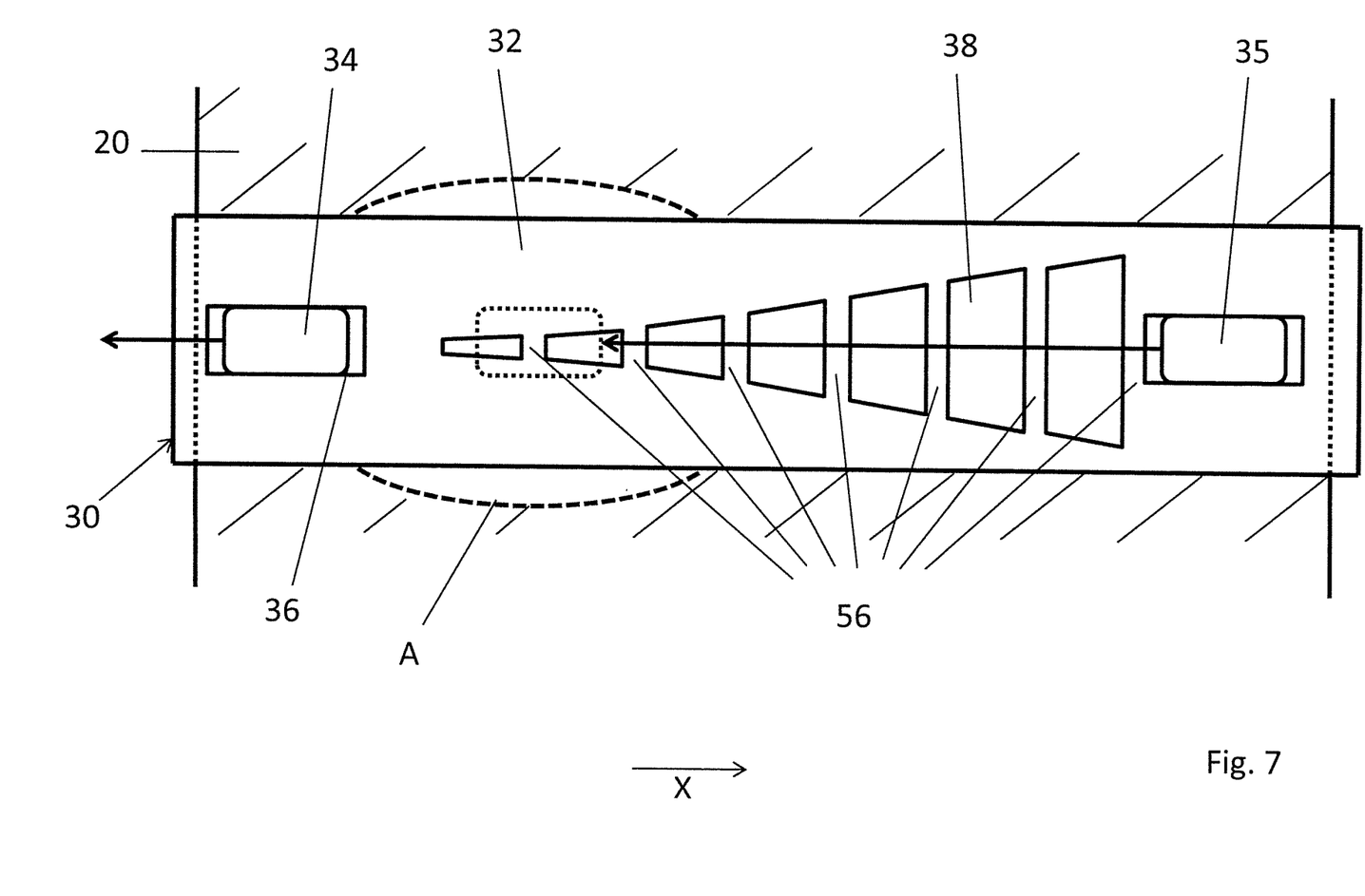
FIG. 7 shows another embodiment of a load reduction means, realised at a drive slide for a sliding roof lid.

In FIG. 7, a load reduction means 30 is illustrated that is formed by a sheet metal insert, which is realised at a drive slide 20. The sheet metal insert 32, which constitutes the catch means, includes a ladder structure in a manner corresponding to the embodiment according to FIG. 5, the recess 38, which is interrupted by the ribs 56 of the ladder structure and also includes a narrow mounting portion for the stud 35, being tapered in the direction of recess 36, in which the stud 34 of the respective drive cable in the mounted position is arranged. Thereby, the sheet metal insert 32, by way of the stud 35 being traversed in the recess 38 and when the ribs 56 are successively pierced, is widened in the region A, which can exert an additional braking force onto the lid member 16 in connection with a guide track of a guide rail.

Figure 8:
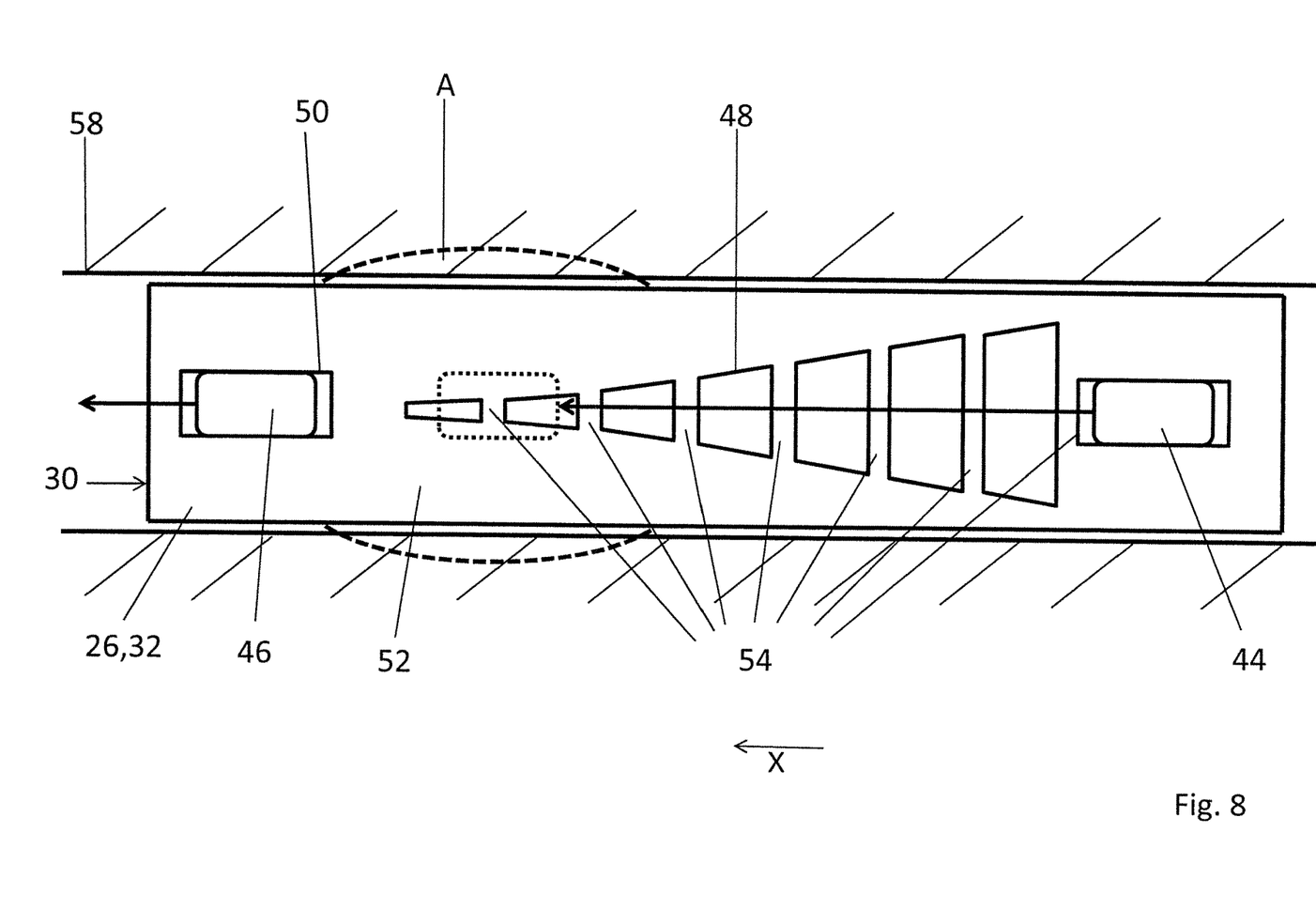
FIG. 8 shows another embodiment of a load reduction means, arranged at a plastics injection moulded section of a drive cable.

In FIG. 8, another embodiment of a load reduction means 30 is illustrated that includes a catch means 52, which is realised as a sheet metal insert, and which is arranged in a plastics injection moulded section of a drive cable and includes, in a manner corresponding to the embodiment according to FIG. 4, a recess 48, which is tapered and interrupted by ribs 54. In contrast to the embodiment according to FIG. 4, the ribs 54 are, however, not interrupted, but realised continuously in the vertical direction. By way of the tapering, the plastics injection moulded section 26 of the respective drive cable 24A or 24B, can additionally be jammed in a guide track 58 of the respective guide rail 22A or 22B when the stud 44, which is connected to the drive slide 20, pierces the ribs 54 and widens or spreads the sheet metal insert 52 and the plastics injection moulded section 26.

Figure 9:
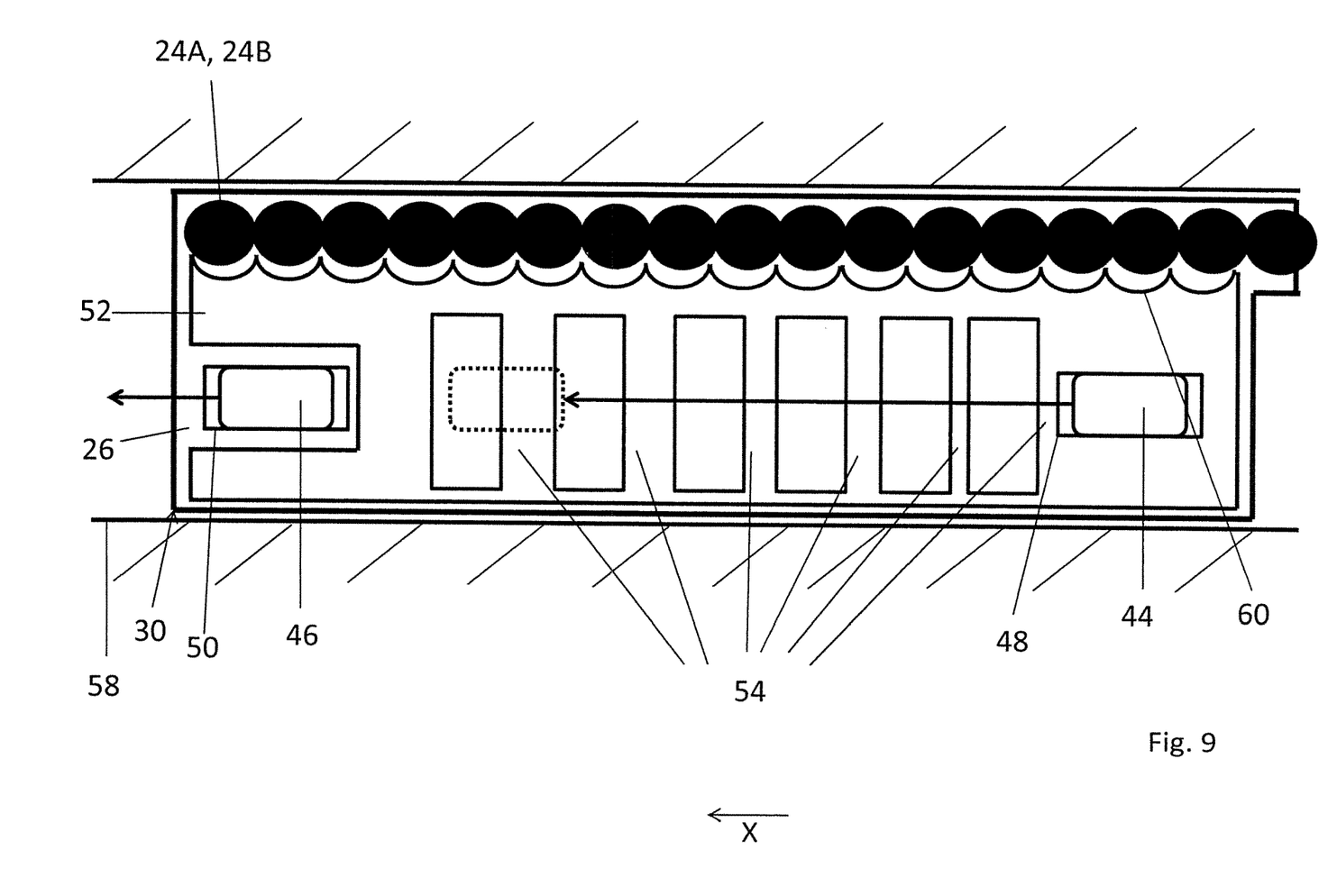
FIG. 9 shows an embodiment of a load reduction means, realised at a plastics injection moulded section of a drive cable and being engaged with the drive cable.

In FIG. 9, another embodiment of a load reduction means 30 is illustrated, which substantially corresponds to the embodiment according to FIG. 5, but differs from the same in that a catch means 52, which is realised as a sheet metal insert, includes a wave structure 60 at the upper edge, a screw-like winding of a drive cable 24, which is realised as a gradient cable, engaging said wave structure. The connection between the drive cable and the load reduction means 30 is thereby stabilised. Apart from that, the load reduction means according to FIG. 9 corresponds to the load reduction means according to FIG. 5.

Figure 10:
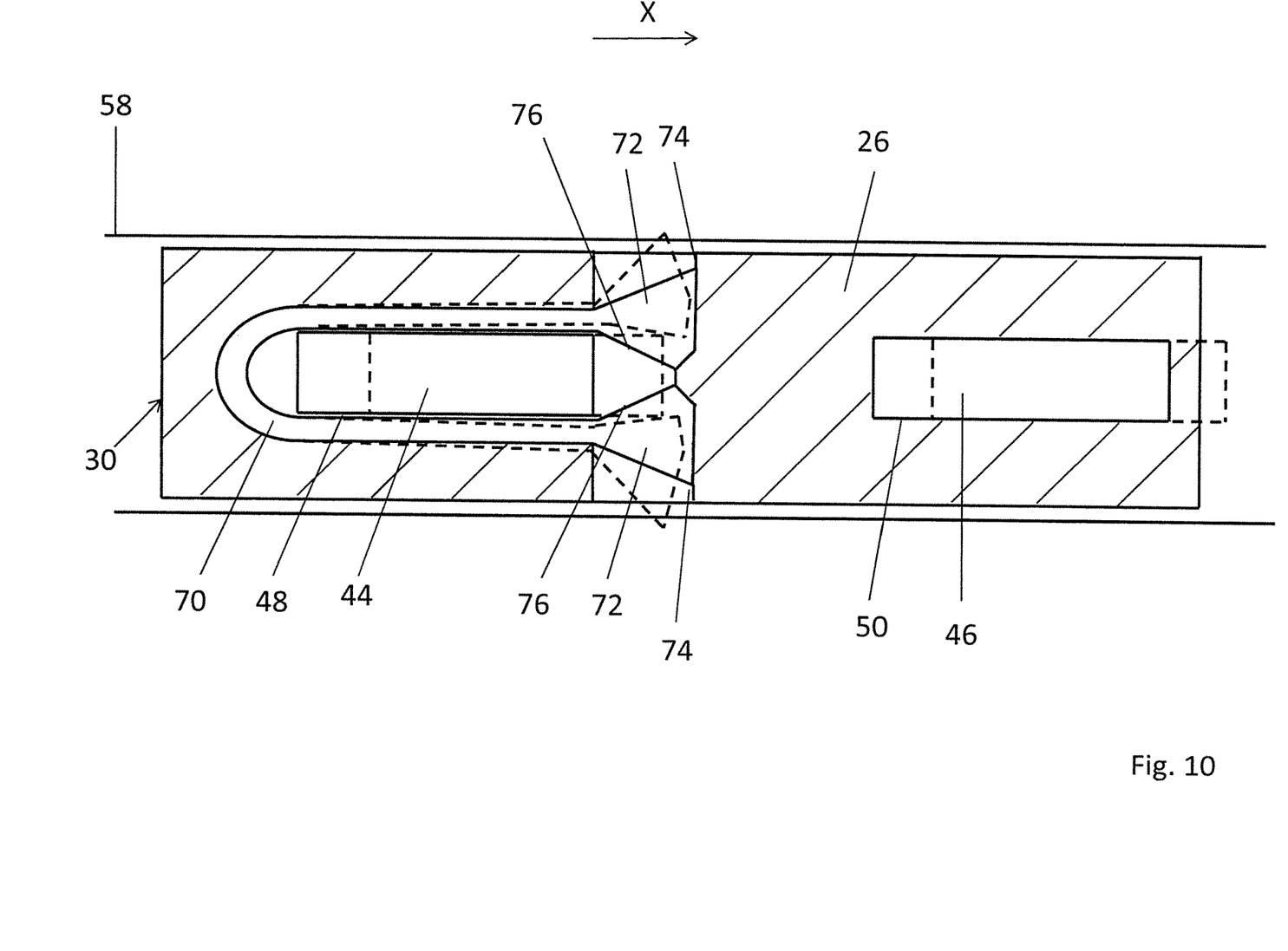
FIG. 10 shows another alternative embodiment of a load reduction means having chocks.

In FIG. 10, a plastics injection moulded section 26 of a drive cable, which is not illustrated in more detail otherwise, of a sliding roof system of the kind illustrated in FIG. 1 is shown. In a manner corresponding to the above embodiments, two studs 44 and 46 of a drive slide for a lid member of a sliding roof system engage the plastics injection moulded section. Stud 44 is received by a catch means 70, which is realised as a sheet metal insert, and which is U-shaped at least in the broadest sense and limits a recess 48 with its legs. The stud 46 is received by a recess 50, which is directly realised in the plastics injection moulded section 26.

The catch means 70, which forms a load reduction means 30 together with the stud 40, includes a chock 72 on each of its free leg ends, said chock being provided with a braking rim 74 on its outside. At the side facing the recess 48, each of the chocks 72 has a spreading surface 76, which serves as a drive-up ramp for the stud 44 when the load reduction means or rather the catch means 32 is being activated.

The load reduction means that is illustrated in FIG. 10 works in the manner that is described in the following.

In normal operation of the assigned sliding roof system, the studs 44 and 46 are stationarily received in their receptions 48 and 50, such that an actuation of the drive cable, onto which the plastics injection moulded section 26 moulded, is directly converted into a traversing movement of the drive slide at which the studs 44 and 46 are realised. If an accident situation now, however, exists in the open position of the lid member and the lid member and hence the drive slide and the studs, which are connected to the drive slide, are rapidly accelerated in the direction of the arrow X, that means in the front direction of the vehicle relative to the vehicle structure, the stud 44, in the kind illustrated in FIG. 10 in dashed lines, is traversed against the spreading surfaces 76 of the catch means 70, which leads to the same being spread open, as a result of which the chocks 72 are dislocated in the direction of the guide surfaces of the guide track 58 and the braking rims 74 get clutched at the guide surfaces. The kinematic energy of the stud 44 or of the lid member connected to the same is hence introduced into the guide rail via the chocks 72, as a result of which the plastics injection moulded section 26 can be prevented from breaking away from the drive cable. Hence, the risk of the lid member getting detached from the vehicle structure is minimised. Simultaneously with the relative movement of the stud 44 relative to the plastics injection moulded section 26, the stud 46 pierces the boundary wall, which is arranged in the direction of movement and on the face side, of the recess 50, as it is indicated in FIG. 10, likewise in dashed lines.

Figure 11:
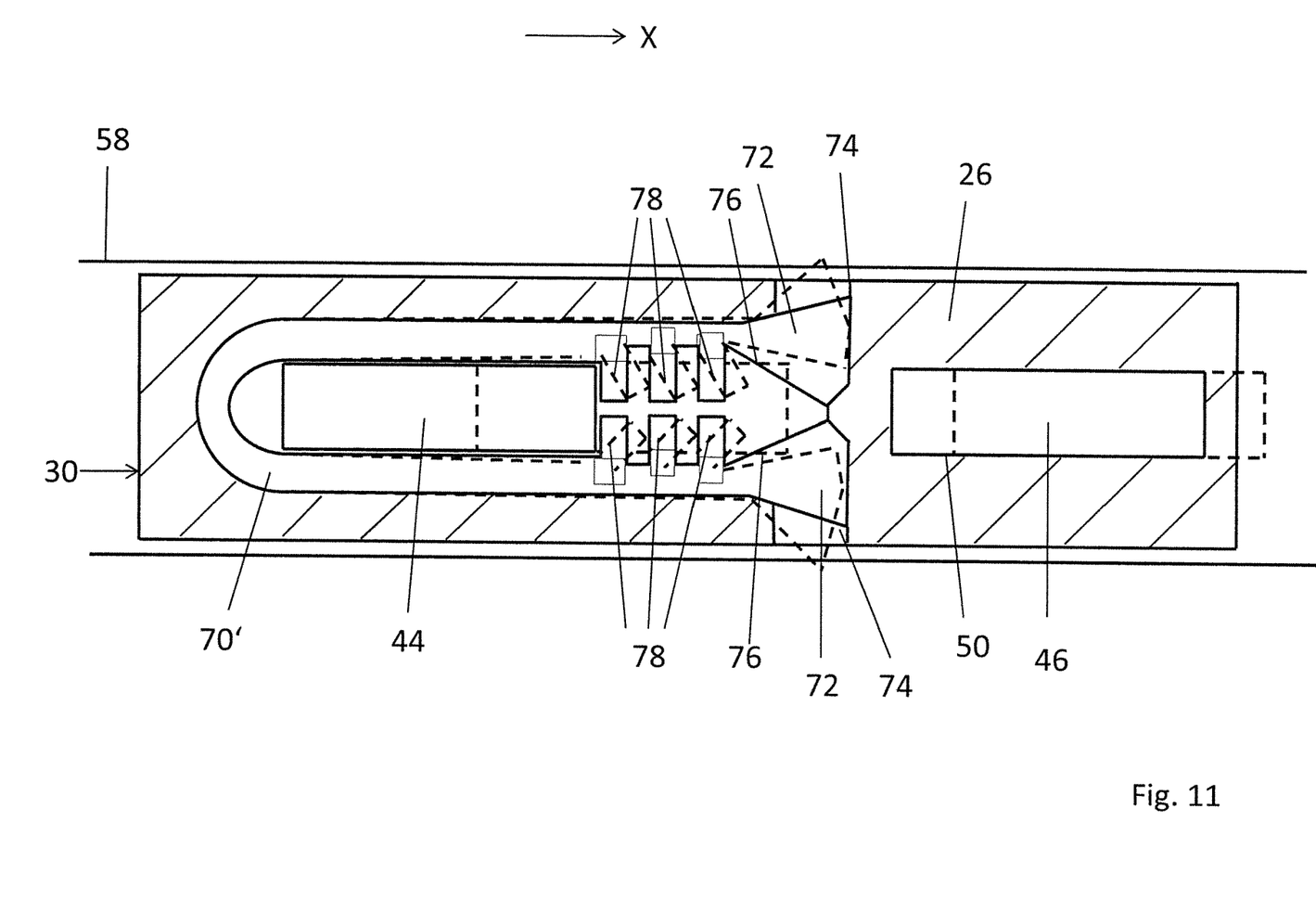
FIG. 11 shows an embodiment of a load reduction means having chocks and deformation elements.

In FIG. 11, another embodiment of a load reduction means 30 is illustrated, which corresponds to the load reduction means according to FIG. 10 to a large extent, but differs from the same in that the catch means 70', which is formed from a sheet metal insert, includes deformation elements 78 on its inside, which are realised in the shape of pins or interrupted ribs and are arranged between the stud 44 and the spreading surfaces 76 of the chocks 72 in normal operation of the assigned sliding roof system.

In an accident situation, in which the lid member, which is connected to the studs 44 and 46, is accelerated rapidly from its open position relative to the vehicle structure in the direction of the arrow X, the stud 44 is gradually traversed against the deformation elements 78, as a result of which the same are deformed, kinetic energy being dissipated. After all deformation elements 78 have been overrun, the stud is traversed against the spreading surfaces 76, such that the catch means 70' is spread open and the braking rims 74 of the chocks 72 get clutched at the guide surfaces of the guide track 58. Hence, the plastics injection moulded sections 26 can be prevented from breaking away and the lid member can be prevented from getting detached from the vehicle structure.

LIST OF REFERENCE NUMERALS 10 motor vehicle
12 vehicle roof
14 sliding roof system
16 lid member
18 fixed-roof portion
20 drive slide
22A, B guide rails
24, 24A, B drive cables
26 plastics injection moulded section
28 sliders
30 load reduction means
32 catch means
34 stud
35 stud
36 recess
38 recess
40 slot
42 ribs
44 stud
46 stud
48 recess
50 recess
52 catch means
54 ribs
56 ribs 58 guide track
60 wave structure
70, 70' catch means
72 chock
74 braking rim
76 spreading surface
78 deformation element

The invention claimed is:

1. A motor vehicle having a vehicle structure and
a vehicle part that can be displaced relative to the vehicle structure with the aid of at least one drive cable that is provided with a plastics injection molded section for joining the drive cable to the vehicle part,
characterized by a load reduction device that comprises at least one coupling member which allows a relative movement between the displaceable vehicle part and the drive cable in the case of an acceleration of the vehicle part relative to the vehicle structure and which interacts with a catch device during the relative movement,
the catch device absorbing or discharging at least part of the kinetic energy resulting from the acceleration, and
wherein the catch device comprises deformation elements that are deformed and/or destroyed by the coupling member during the relative movement between the vehicle part and the drive cable.

2. The motor vehicle according to claim 1, characterized in that the coupling member comprises at least a tab, a pin or a stud that can be advanced in the catch device.

3. The motor vehicle according to claim 1 wherein the coupling member is connected to the vehicle part or to a slide of the vehicle part in a rigid fashion and in that the catch device is assigned to the plastics injection molded section of the drive cable.

4. The motor vehicle according to claim 1 wherein the coupling member is connected to the plastics injection molded section of the drive cable in a rigid fashion and in that the catch device is interconnected with a slide of the vehicle part.

5. The motor vehicle according to claim 1, wherein the ribbing is formed by partition walls of a recess of the catch device.

6. The motor vehicle according to claim 5, wherein the thickness of the partition walls grows in the direction of movement of the coupling member during the relative movement between the vehicle part and the drive cable.

7. The motor vehicle according to claim 5, wherein the recess is tapered in the direction of movement of the coupling member during the relative movement between the vehicle part and the drive cable.

8. A motor vehicle having a vehicle structure and
a vehicle part that can be displaced relative to the vehicle structure with the aid of at least one drive cable that is provided with a plastics injection molded section for joining the drive cable to the vehicle part,
characterized by a load reduction device that comprises at least one coupling member which allows a relative movement between the displaceable vehicle part and the drive cable in the case of an acceleration of the vehicle part relative to the vehicle structure and which interacts with a catch device during the relative movement,
the catch device absorbing or discharging at least part of the kinetic energy resulting from the acceleration,
wherein the catch device comprises deformation elements that are deformed and/or destroyed by the coupling member during the relative movement between the vehicle part and the drive cable, and
wherein the catch device is formed by a sheet metal insert of the plastics injection molded section.

9. A motor vehicle having
a vehicle structure and
a vehicle part that can be displaced relative to the vehicle structure with the aid of at least one drive cable that is provided with a plastics injection molded section for joining the drive cable to the vehicle part,
characterized by a load reduction device that comprises at least one coupling member which allows a relative movement between the displaceable vehicle part and the drive cable in the case of an acceleration of the vehicle part relative to the vehicle structure and which interacts with a catch device during the relative movement, the catch device absorbing or discharging at least part of the kinetic energy resulting from the acceleration,
wherein the catch device is formed by a sheet metal insert of the plastics injection molded section; and
wherein the sheet metal insert has a corrugated longitudinal edge that corresponds to a wrapping of a drive cable that is realized as a gradient cable.

10. The motor vehicle according to claim 1, wherein the catch device is spread open during the relative movement between the vehicle part and the drive cable.

11. The motor vehicle according to claim 10, wherein the catch device includes at least one spreading surface against which the coupling member is traversed during the relative movement between the vehicle part and the drive cable.

12. The motor vehicle according to claim 10, wherein the catch device includes at least one braking rim that engages a guide surface when the catch device is being spread open, the guide surface being realized at a guide rail.

13. The motor vehicle according to claim 1, wherein the vehicle part is a lid member of a sliding roof system.

14. The motor vehicle according to claim 1, wherein the deformation elements are formed by a ribbing of the catch device.

* * * * *